United States Patent
Banaska et al.

(10) Patent No.: US 8,055,468 B1
(45) Date of Patent: Nov. 8, 2011

(54) OUTPUT LEAKAGE COMPENSATION AND METHOD FOR IMPLEMENTING THE SAME

(75) Inventors: John G. Banaska, Wadsworth, OH (US); Gregory Roberts, Cleveland, OH (US)

(73) Assignee: Keithley Instruments, Inc., Cleveland, OH (US)

( * ) Notice: Subject to any disclaimer, the term of this patent is extended or adjusted under 35 U.S.C. 154(b) by 514 days.

(21) Appl. No.: 11/840,736

(22) Filed: Aug. 17, 2007

(51) Int. Cl.
*G01K 7/00* (2006.01)

(52) U.S. Cl. .................................................. 702/130

(58) Field of Classification Search .................. 702/51, 702/57, 60, 64, 65, 85, 87, 88, 99, 107, 116, 702/118, 120, 130, 136, 182–184, 193; 236/11; 323/268

See application file for complete search history.

(56) References Cited

U.S. PATENT DOCUMENTS

| | | | | |
|---|---|---|---|---|
| 4,035,715 | A | * | 7/1977 | Wyman et al. ................ 323/268 |
| 5,244,146 | A | * | 9/1993 | Jefferson et al. ................ 236/11 |
| 6,342,997 | B1 | * | 1/2002 | Khadkikar et al. ........... 361/103 |

* cited by examiner

*Primary Examiner* — Mohamed Charioui
(74) *Attorney, Agent, or Firm* — Pearne & Gordon LLP

(57) ABSTRACT

An electronic instrument having in its circuitry a specific solid state switch that exhibits detrimental current leakage at elevated temperatures, a variable voltage device in the instrument connected to the specific switch, the variable voltage device being capable, at an experimentally determined voltage setting, of zeroing out the leakage current in the specific switch, the variable voltage device being set at a voltage setting determined experimentally using said specific switch at an elevated temperature thereby temperature compensating said specific switch.

11 Claims, 1 Drawing Sheet

OUTPUT LEAKAGE COMPENSATION AND METHOD FOR IMPLEMENTING THE SAME

BACKGROUND OF THE INVENTION

The invention relates to electronic instrumentation and, in particular, to instruments for measuring electrical characteristics that are self-compensating for operational temperature conditions.

PRIOR ART

Electronic equipment to measure electrical parameters such as current is regularly constructed with multiple range settings to afford the equipment with a high degree of utility and precision. More specifically, a particular switch is selected from a group or network of switches to connect a certain impedance into a circuit to be used for measurement of some current level. Solid state switches are used in these range selector applications because of their reliability and relatively low cost. U.S. Pat. No. 5,994,947 assigned to the assignee of the present invention describes a low leakage solid state switch useful as a selector switch. It has been discovered that solid state switches, particularly high current devices, being used to measure 1-3 amps in a Source Measure Unit (SMU), for instance, can be susceptible to current leakage when they are operating at elevated temperatures approaching 75° C. for example, a temperature that can be expected in service when the SMU instrument is operating in an ambient temperature of say 50° C.

SUMMARY OF THE INVENTION

The invention involves a system and method by which electronic instrumentation is made self-compensating for temperature induced deviation of componentry from ideal performance to thereby improve accuracy.

The invention capitalizes on the realization that electronic instrumentation typically incorporates many and, often, most of the elements needed to monitor temperature and electrical conditions and to bias or otherwise adjust the electrical state of an element of the instrumentation circuitry. Moreover, the instrumentation may incorporate a microcontroller to automatically perform certain steps in the regular use of the instrument. Thus, the typical instrument possesses a basic platform or nearly a complete platform of electronics to control the characteristics of its components under actual service conditions. Under the invention, a limited addition of electronic circuitry can effect necessary electrical measurements and generate compensating influences as well as program the acquisition and use of this data.

In the present disclosure, the invention is embodied in a SMU. The disclosed SMU, like such prior art devices, includes in the space of its housing, an internal thermocouple on its printed circuit board carrying its electronics, a temperature controller such as a microcontroller with a programmed temperature control routine, and an internal fan operated by the controller. The SMU employs a high current solid state switch in a range changing network. This high current solid state switch or HCSSS is found to exhibit leakage when existing at elevated temperatures in the housing of, say 75° C. A dedicated variable voltage source, such as a digitally controlled potentiometer, not previously existing in prior art SMUs, is connected to a side of the HCSSS and a microcontroller, either an existing component, a component analogous to an existing component, or a newly added component to prior art designs is programmed (e.g. as firmware) and connected to control the potentiometer in a manner described below.

In accordance with the invention, the SMU is originally manufactured incorporating the above-described componentry being comprised of basic electrical components found in prior art SMUs and limited supplementary components as described. The newly assembled SMU is operated or at least electrically energized so that its internal currents raise the temperature within the housing including the temperature of the HCSSS. This warm-up or heating can be accelerated, as desired, by programming (e.g. with firmware) the microcontroller operating the internal cooling fan to delay or derate its normal operation. As the temperature, monitored by the thermocouple in the housing space rises and/or reaches a maximum operating temperature, the leakage occurring in the HCSSS is also monitored. The microcontroller, at an appropriate time or times, changes the output of the digital potentiometer to bias one side of the HCSSS, increasing the bias until at a predetermined peak temperature, the leakage current is essentially zero. The control firmware, thereafter, follows a normal program while leaving the bias of the potentiometer at the determined leakage compensating setting. The SMU is thereafter packaged and otherwise readied for shipment to an ultimate end user. The controller routine for compensating against switch leakage remains dormant until, if necessary, the HCSSS is replaced with a different unit at which time it can be redeployed in the manner described.

DESCRIPTION OF THE PREFERRED EMBODIMENT

Figure 1:
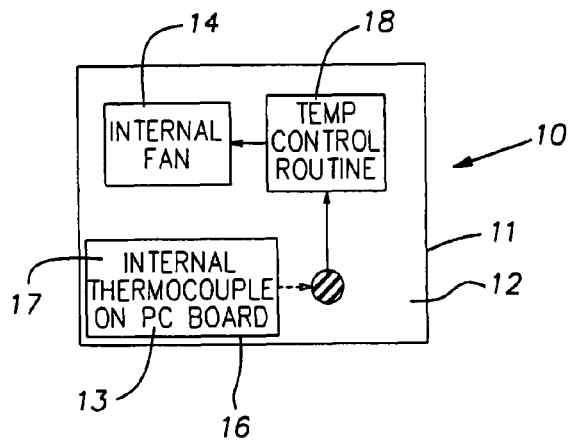
FIG. 1 is a schematic diagram of some of the elements contained in the housing of a Source Measurement Unit (SMU)

FIG. 1 diagrammatically represents an electronic instrument in the form of a Source Measurement Unit (SMU) 10 that includes, as is conventional, a housing or casing 11 which encloses a space 12 containing electronic componentry 13 and an internal cooling device such as a fan 14. The electronic componentry is schematically shown as mounted on a printed circuit board 16. An electronic temperature sensor in the form of an internal thermocouple 17 monitors the temperature of the space 12 inside the housing 11.

A microcontroller or equivalent device 18, programmed with firmware, receives signals from the temperature sensor or thermocouple 17 and, among other functions, some of which are disclosed below, controls operation of the cooling fan 14 during normal use of the SMU. The thermocouple 17 and controller 18 are capable of controlling the fan 14 to maintain the internal temperature of the SMU plus or minus 1° C., for example.

Figure 2:
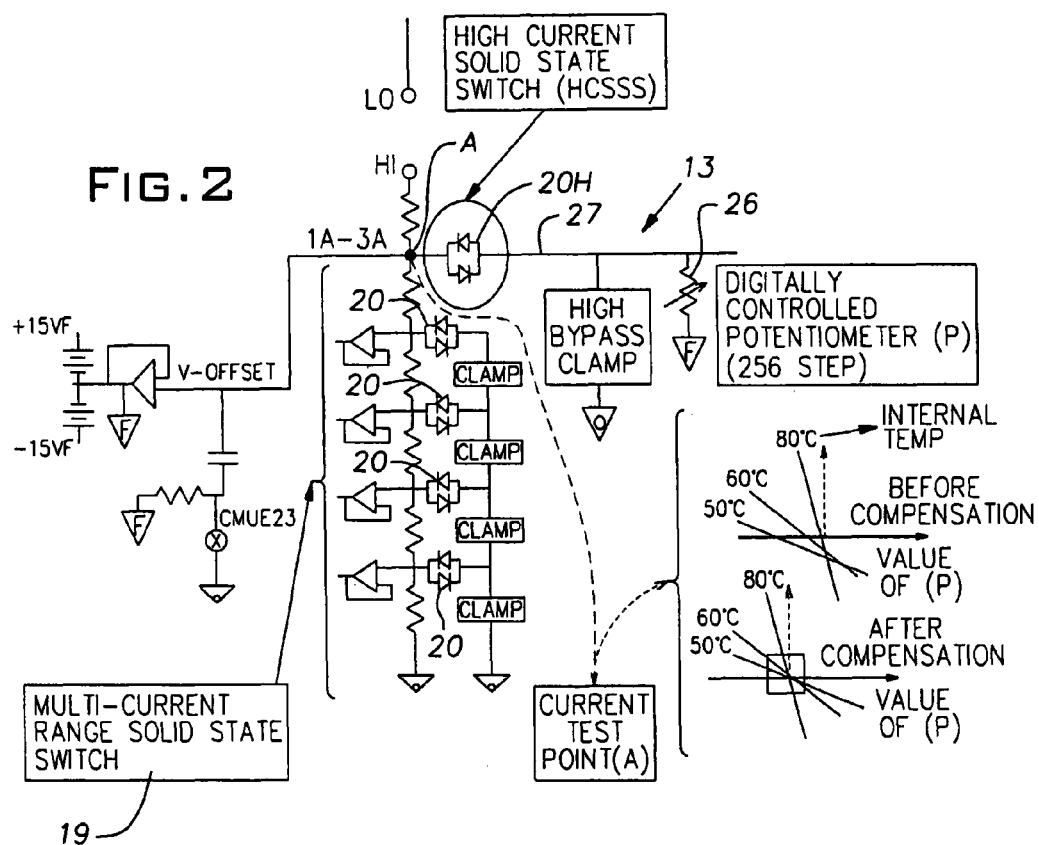
FIG. 2 is a schematic electrical diagram of a range switch network of the SMU including a high current solid state switch (HCSSS) and potentiometer for applying a compensating voltage to the HCSSS.

FIG. 2 schematically illustrates a network of solid state range switches 20, electronic components that ideally exist in either electrically conducting or non-conducting states. The switches are suitably located in the housing 11 and individually selected by the person operating the SMU instrument; the particular solid state switch 20 selected by the user is one which correlates to the amperage level to be measured. It is also possible for the range switches to be controlled by unshown external electronic control systems. An explanation of the operation of a solid state switch is given in U.S. Pat. No. 5,994,947, the disclosure of which is incorporated herein by reference.

One of the range switches 20H characterized as a high current solid state switch (HCSSS), has been discovered to leak current when subjected to elevated temperatures. The leakage current through the HCSSS introduces an error in current measurements made by the SMU. The precise value of the leakage current depends on the particular HCSSS component assembled in the housing 11. Different HCSSSs having the same manufacturer part number and identical specifications and tolerances can be expected to have different leakage characteristics, thereby making a standard or universal compensation unsatisfactory.

As originally assembled by the manufacturer, the SMU permanently includes a variable voltage source in the form of a digital potentiometer 26. The potentiometer 26 can be, for instance, a 256 step device capable of varying its voltage between +2 to −2 mV (millivolts). After the SMU has been initially assembled, it is turned on electrically and current leakage through the HCSSS is monitored at a point A. Current leakage data is transmitted to the microcontroller 18. The microcontroller 18 is advantageously programmed so that during this initialization period, the cooling action of the fan 14 can be suppressed to accelerate the warm up of the interior space 12 of the housing and in particular the temperature of the HCSSS. Experience reveals that a 75° C. temperature measured in the space 12 at the thermocouple corresponds to a 50° C. environment of the SMU and this thermocouple temperature can be used as a worst case or limiting temperature for which current leakage at the HCSSS need be compensated. The microcontroller 18 is programmed so that when it sees that the thermocouple 17 is reading 75° C., and while it is monitoring the leakage current at point A, it adjusts the potentiometer 26 to apply a voltage to a line 27 on the HCSSS until the leakage current goes essentially to 0.

The voltage setting of the potentiometer 26 found to zero out the leakage current for the particular HCSSS assembled in the unit 10 is recorded in the microcontroller 18. The current leakage compensation process for a particular SMU is completed at this time and the SMU can be prepared for shipment to an ultimate user. When the SMU is subsequently used in regular service, the microcontroller, by virtue of its firmware, will not ordinarily repeat the compensation process. The process can be repeated in the unexpected event that the HCSSS must be replaced. In regular service, with the SMU turned on, the microcontroller 18 will maintain the potentiometer 26 at the voltage determined to zero out the leakage current at the HCSSS. The described initialization procedure for eliminating leakage at the HCSSS is best performed at the manufacturing site so that a SMU can be fully tested thereafter before it is shipped to a customer; however, where experience has proven this to be unnecessary, the initialization procedure can be performed automatically by the microcontroller when the ultimate user first turns on the SMU.

While the foregoing description considers a HCSSS that exhibits a leakage current that changes linearly with temperature, a firmware algorithm can be created to deal with a current leakage response of almost any character. Operation of the HCSSS at temperatures lower than the selected worst case temperature (e.g. 75° C.) will not affect the setting of the compensation scheme because the leakage of the HCSSS is low enough so that it is negligible at lower operating temperatures. It is possible in practicing aspects of the invention, to manually adjust a voltage source such as a manually operated potentiometer to apply a leakage eliminating voltage to the HCSSS rather than using the described automatic process where the microcontroller 18 adjusts the digital potentiometer. While the foregoing description references the use of microcontrollers other electronic programmable controllers such as DSPs or FPGAs are adaptable for use with the invention.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An electronic instrument having in its circuitry a specific solid state switch that exhibits detrimental current leakage at elevated temperatures, a variable voltage device in the instrument connected to the specific solid state switch, the variable voltage device being capable, at an experimentally determined voltage setting, of zeroing out the leakage current in the specific solid state switch, the variable voltage device being set at a voltage setting determined experimentally using said specific solid state switch at an elevated temperature thereby temperature compensating said specific solid state switch.

2. An electronic instrument as set forth in claim 1, wherein said variable voltage device is a potentiometer.

3. An electronic instrument as set forth in claim 2, wherein said potentiometer is a digitally controlled unit.

4. An electronic instrument as set forth in claim 1, in the form of a source measure unit (SMU), the SMU having an internal fan, a temperature sensor, and a control for operating the fan in response to signals from the temperature sensor.

5. An electronic instrument as set forth in claim 4, wherein said variable voltage device is a digital potentiometer, and including an automatic control responsive to said temperature sensor and leakage current developed by said specific solid state switch, said automatic control being arranged to initially and under normal circumstances permanently set said potentiometer to an output voltage that causes the specific solid state switch leakage current to go essentially to zero when the specific switch is at an elevated temperature.

6. A method of compensating for temperature induced current leakage in a solid state switch installed in a newly assembled electronic instrument comprising the steps of causing the installed solid state switch to reach an elevated temperature corresponding to an operational temperature in the solid state switch during regular use of the instrument, sensing a temperature indicative of the temperature of the solid state switch, monitoring the current leakage through the switch while it is at said elevated temperature, applying a voltage to the switch to oppose the leakage current, recording a value corresponding to a compensating voltage necessary to reduce the current leakage essentially to zero in a manner such that, in subsequent regular use of the instrument, the compensating voltage can be re-established on the switch to improve the performance of the instrument.

7. A method as set forth in claim 6, wherein the data record for the compensating voltage is registered in an electronic controller.

8. A method as set forth in claim 7, wherein a temperature sensor is used to determine the temperature of the switch and is employed to control operation of an internal cooling fan in the instrument.

9. A method as set forth in claim 8, wherein a digital potentiometer is used to produce the compensating voltage.

10. A method as set forth in claim 9, wherein the digital potentiometer is adjusted by an electronic programmable controller.

11. A method as set forth in claim 10, wherein a common controller operates the digital potentiometer and the internal cooling fan.

* * * * *